(No Model.)　　　　　　　　　　　　　　5 Sheets—Sheet 1.
F. PRINZ.
SMUT MACHINE.

No. 380,348.　　　　　　　　　Patented Apr. 3, 1888.

(No Model.) 5 Sheets—Sheet 3.

F. PRINZ.
SMUT MACHINE.

No. 380,348. Patented Apr. 3, 1888.

Witnesses. Inventor

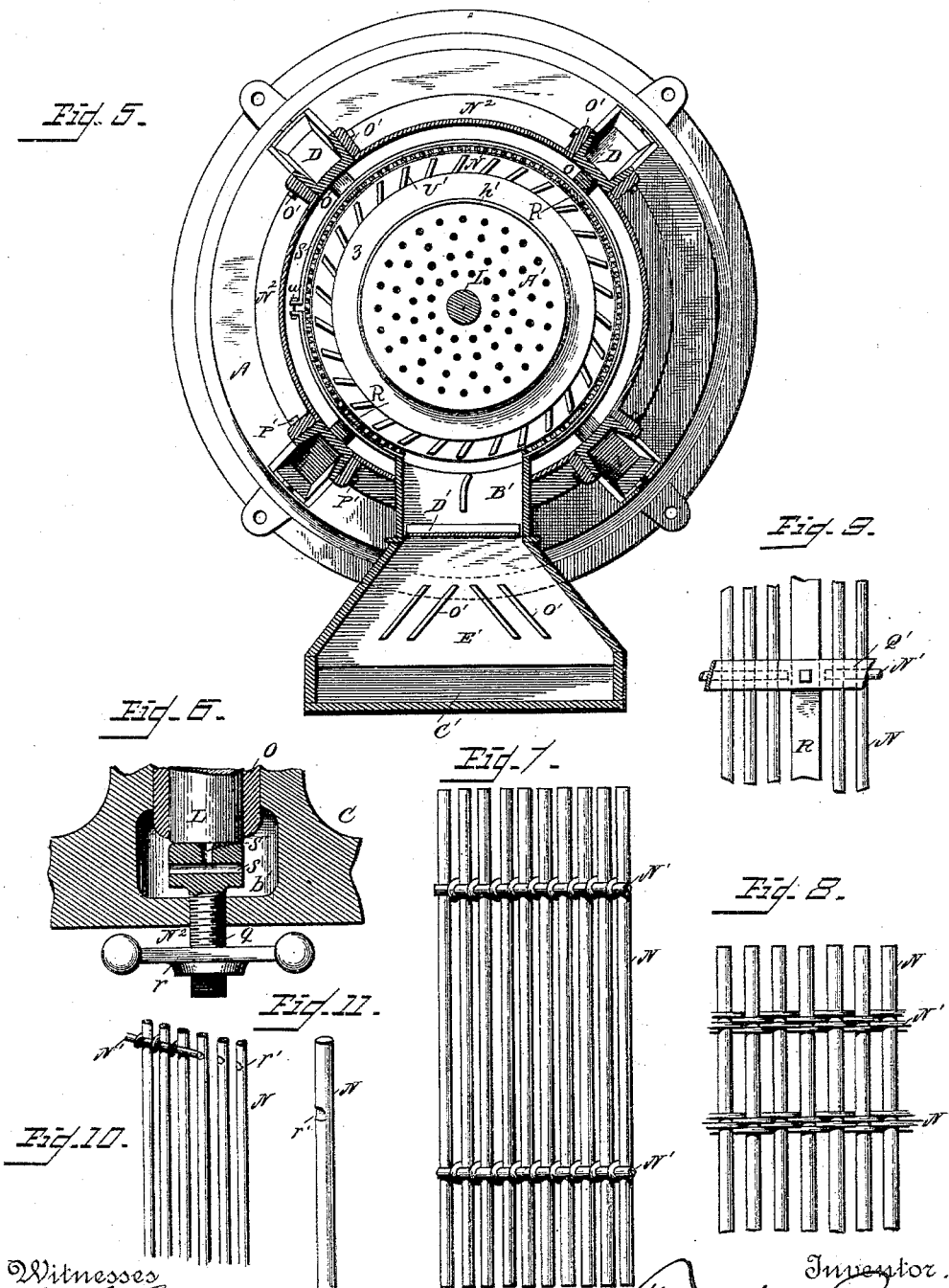

(No Model.)  5 Sheets—Sheet 5.

F. PRINZ.
SMUT MACHINE.

No. 380,348. Patented Apr. 3, 1888.

Witnesses  Inventor,

UNITED STATES PATENT OFFICE.

FAUSTIN PRINZ, OF MILWAUKEE, WISCONSIN.

SMUT-MACHINE.

SPECIFICATION forming part of Letters Patent No. 380,348, dated April 3, 1888.

Application filed October 14, 1886. Serial No. 216,253. (No model.)

*To all whom it may concern:*

Be it known that I, FAUSTIN PRINZ, a subject of the Emperor of Germany, residing at Milwaukee, in the county of Milwaukee and State of Wisconsin, have invented certain new and useful Improvements in Smut-Machines; and I do hereby declare the following to be a full, clear, and exact description of the invention, such as will enable others skilled in the art to which it appertains to make and use the same.

My invention relates to smut-machines, and has generally for its object to so form and construct the machine that its durability and efficiency will be increased, as hereinafter particularly described, and pointed out in the claims, reference being had to the accompanying drawings, forming a part hereof, and in which—

Figure 1:
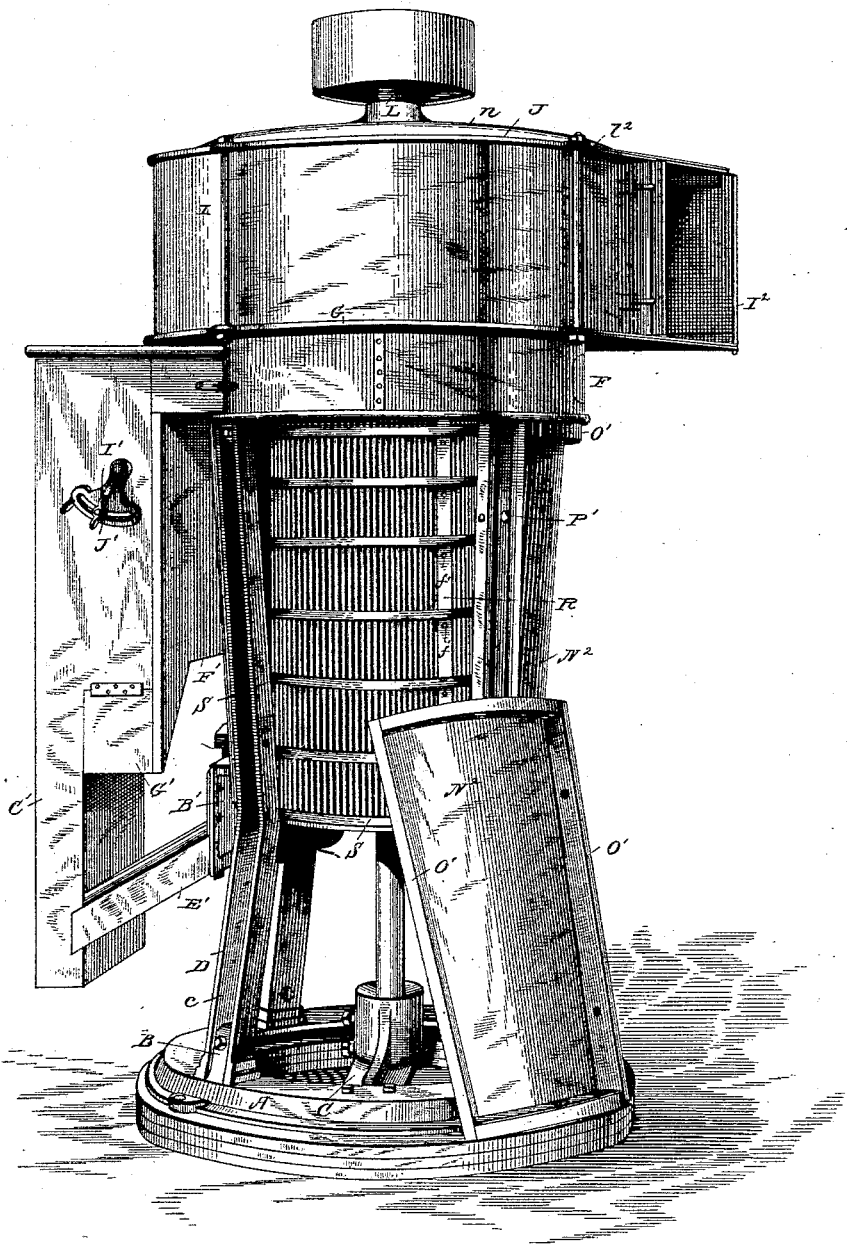
Figure 2:
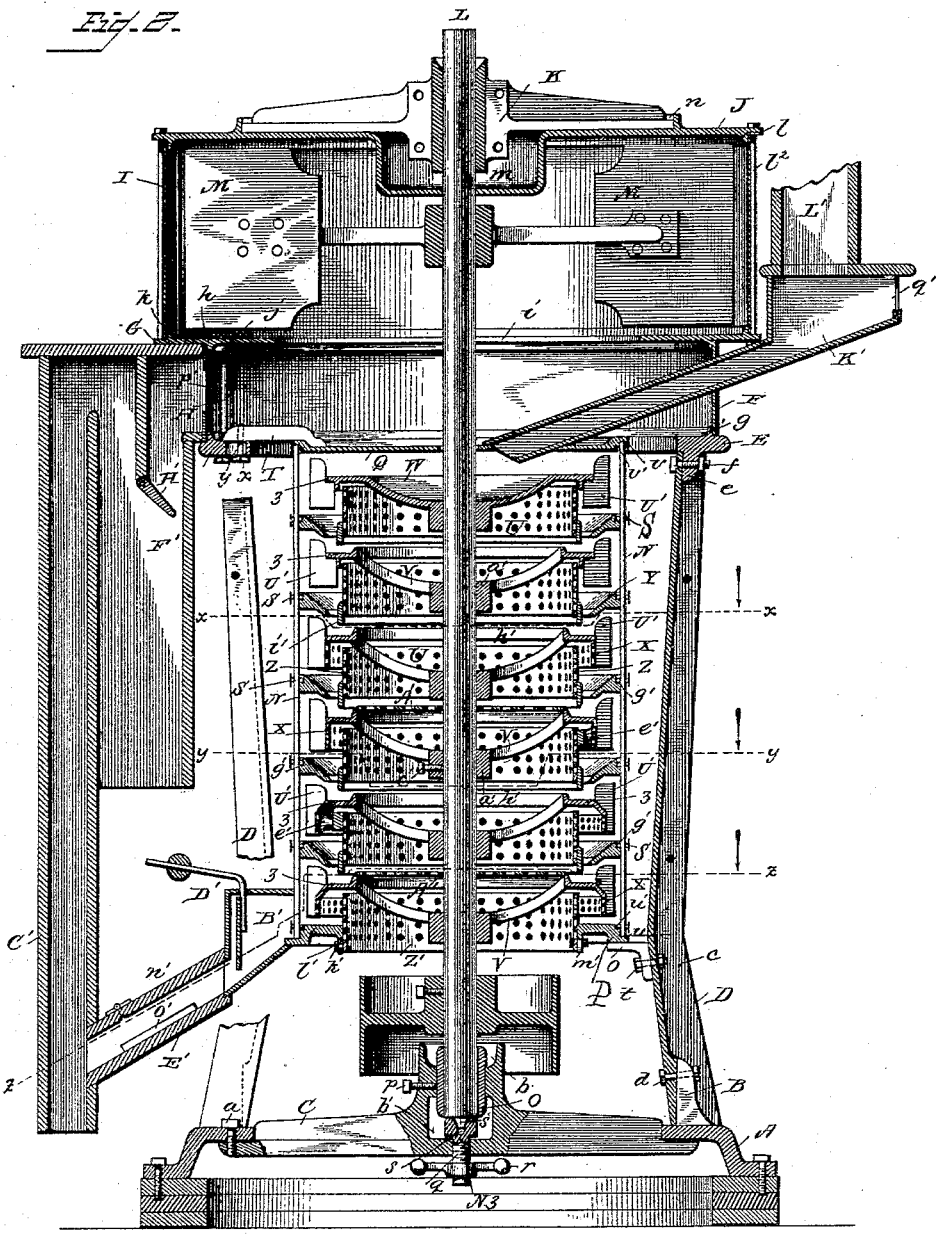
Figure 3:
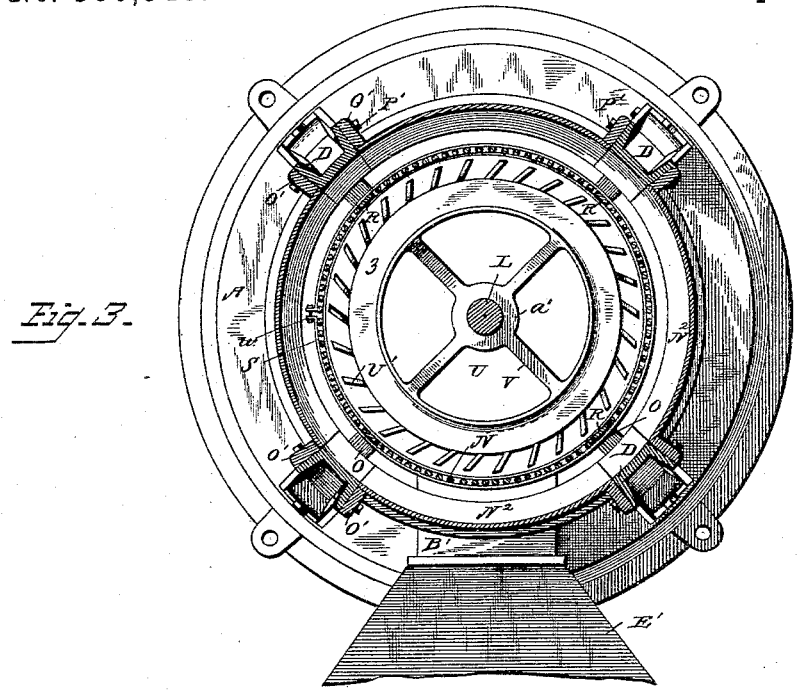
Figure 4:
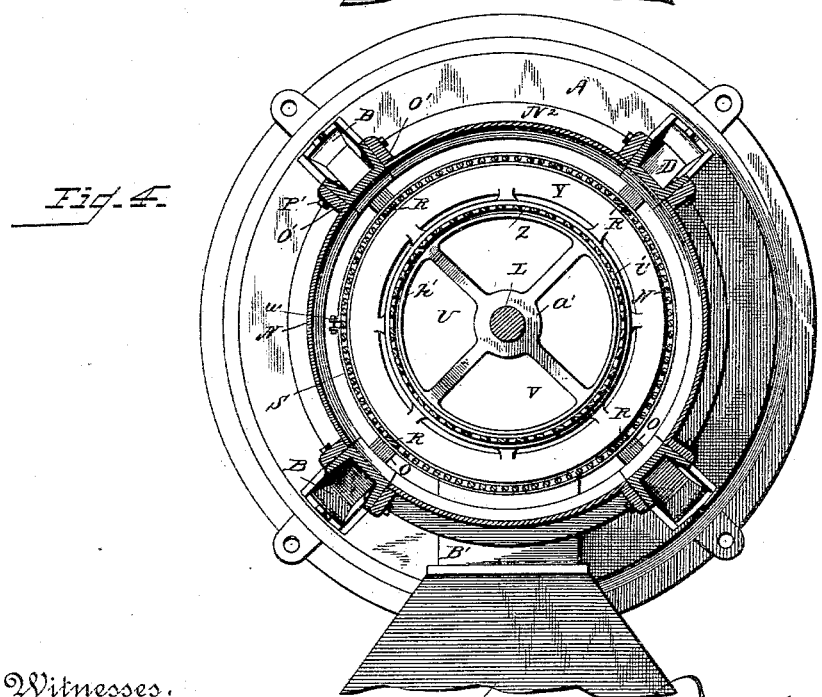
Figure 12:
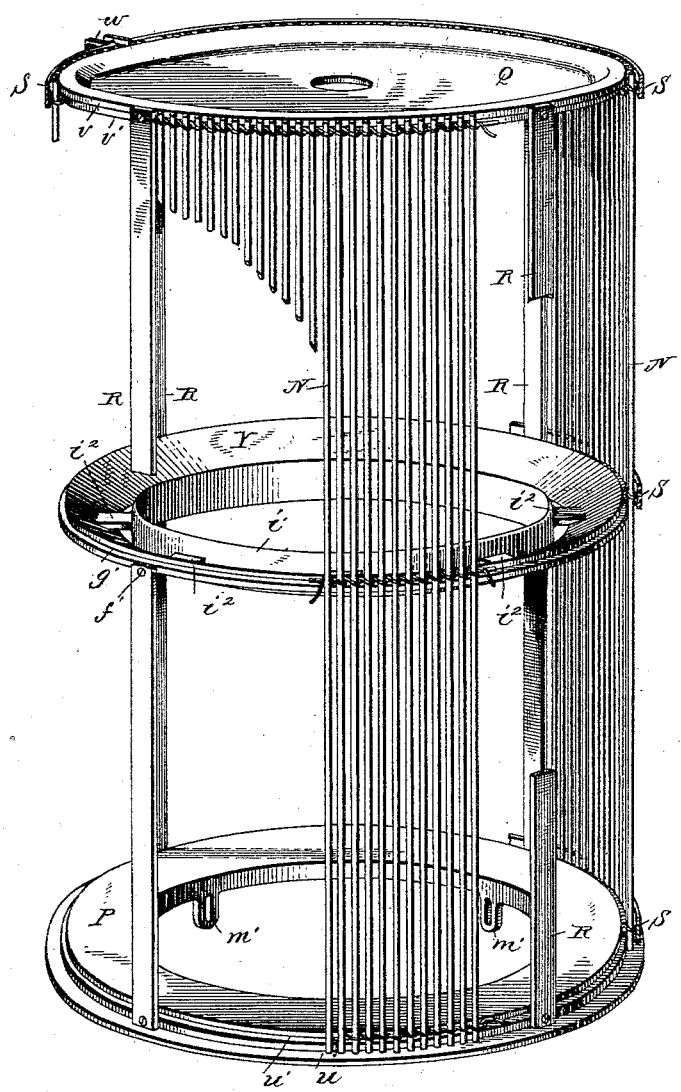

Figure 1 is a perspective view of a machine with a section of outside casing removed; Fig. 2, a vertical section through the machine; Fig. 3, a cross-section on line $x\,x$ of Fig. 2; Fig. 4, a cross-section on line $y\,y$ of Fig. 2; Fig. 5, a cross-section on line $z\,z$ of Fig. 2; Fig. 6, an enlarged detail view of the adjusting-step and a portion of the shaft and bridge-tree; Figs. 7 and 8, detail views of sections of the cleaning-case on an enlarged scale; Fig. 9, a detail view, showing one mode of protecting the binding-cords; Fig. 10, a detail perspective showing bars with notches for the binding-cord to prevent the bars from turning; and Fig. 11, an enlarged view of a portion of a single bar, showing the notch therein. Fig. 12 is a perspective of the cleaning-cylinder, with parts omitted and others broken away, the parts illustrated being on an enlarged scale to illustrate novel points therein.

Under my present invention the grain is brought to a stop, or practically so, inside of the beaters without gaining the same speed as the beaters, with the result of a continued rebounding from top to bottom of the case, a more uniform wear on the latter, the requirement of a lower rate of speed at which to revolve the beaters, and the requirement of less power, and a superior cleaning of the grain. The machine being also constructed of metal is not liable to catch fire and is rendered more durable.

In the accompanying drawings, the letter A designates a metal base of any desired form, but preferably square or round, formed with upwardly-extending lugs B, which may be bolted thereto, but are preferably cast therewith. Extending from one side of the base to the other and secured thereto by any suitable means—for instance, by bolts $a$—is a bridge-tree, C, a portion of which lies against the under side of the base-plate and a portion bears against the inner edge thereof, as illustrated, and which is formed with cavities $b$ and $b'$, which form an oil-cup for the shaft-bearing.

The legs or supports of the machine are composed of any desired number—say four—of upright bars D, each of which is channeled, as shown at $c$, so as to combine strength and lightness, and preferably extended outwardly at its lower end, so as the better to brace the machine, and also outwardly from its lower portion to its upper end, so that when the sides are combined therewith there will be formed an inclosing-casing diverging from its lower to its upper end, whereby a correspondingly-shaped space will be formed around the interior case, thereby to receive the increased volume of air prevailing in the upper portion of the casing.

The legs D rest upon the base A and are secured to the lugs B by bolts $d$, the lugs lying within the channels of the legs. On the tops of the legs rests a plate or ring, E, formed with lugs $e$, which lie within the channels of the legs and through which and the legs, bolts $f$ pass, so as to secure the parts together. The top plate or ring, E, is also formed with a flange, $g$, on its top face to serve as a side bearing for a drum, hereinafter to be described. The legs and top and bottom plates form the frame-work of the machine.

On top of the plate or ring E rests a drum, F, made preferably of sheet metal, with its ends riveted together, the lower inner face of the drum bearing against the outside of flange $g$. A plate, G, rests upon the top edge of the drum and is formed with a flange, $h$, which lies against the inner face of the drum. This plate forms the bottom of the fan-case, and is formed with a central opening, $i$, for the entrance of air into the case, and is held in place by any desired number of bolts H, which pass through the plate or ring E and have their threaded ends enter bosses $j$, formed on the under side of the plate G, so that the top of said plate inside of the fan-case will be free from any obstruction. These bolts also clamp the drum F to its place between the two plates. The plate has formed upon its top, toward its outer edge, a circular flange, $k$, and upon the the plate and around said flange rests a drum, I, preferably formed of sheet metal, and which constitutes the sides of the fan-case. The top of the case is formed of a plate, J, formed on its lower face near its outer edge with a flange, $l$, which lies against the inside of the drum, while the plate itself lies upon the top edge thereof and projects somewhat beyond it. This plate is held to the drum and the drum to its place by any desired number of rods or bolts $l^2$, which pass through both plates G and J outside of the drum and strongly clamp said parts to their places. The outlet of the fan is designated by the letter $I^2$. Such construction forms a fan-case which is simple and strong and easily put together and taken apart. The top J of the fan-case is formed near its center with a depression, $m$, which is formed with an opening for the driving-shaft, and is designed to bring the upper bearing of the shaft as low down as practicable without interfering with the suction of the fan. The bearing is designated by K and rests upon and is secured to the top J in any suitable way, and a flange, $n$, is preferably formed upon the top around the shaft-bearing, so as to aid in holding the latter in place.

The driving-shaft (designated by the letter L) at its upper portion carries the fan-blades M, and is closely packed by any suitable packing where it passes through the opening in the depressed portion of the top, and at its lower end passes through a bearing, $o$, held in the bridge-tree C by a set-screw $p$. This shaft is made vertically adjustable in any suitable manner, for a purpose hereinafter appearing. In the drawings it is represented as adjustable by means of a step, $N^3$, on which it rests, said step having a threaded shank, $q$, which passes through the bridge-tree, and has keyed or otherwise rigidly secured to it a hand lever or wheel, $r$, by turning which the step can be raised or lowered and the shaft correspondingly elevated or lowered.

As the driving-shaft is very heavy in large machines, it is very necessary to keep the point of contact between the shaft and its step well lubricated, and with that object in view, and to effect the oiling automatically, I form a hole, $s$, transversely through the step at a point about half an inch from its top, and also form a hole, $s'$, vertically through the step from its top to the intersection of the transverse hole. By such construction, when the shaft is revolved, the oil is drawn from the oil-chamber $b'$ through the transverse to the vertical hole, and through that to the middle portion of the shaft, from whence it works its way outwardly between the two surfaces to the outside, thus continuously feeding the oil to the points of contact and lubricating the same.

The cleaning case or cylinder is composed of upright bars or rods N, made of steel or any suitable metal, case-hardened, and connected by transverse binding metallic cords or wires N', applied in any suitable way—for instance, by interlacing, as shown in Figs. 7 and 8. The manner of thus connecting the bars or rods together is well known to the trade and not of my invention, and therefore need not be more particularly described. As many sections of these bars or rods may be employed as necessary to form the desired dimensions of the case or cylinder, and my method of combining them is as follows: To the lower portion of the legs D are suitably secured—for instance, by bolts $t$—angle-irons or brackets O, to which is rigidly secured a circular plate or ring, P, which is formed around its periphery with an offset, $u$, for the ends of the bars to rest on, and above that with an offset or recess, $u'$, for the binding-cords to lie in.

The grain in being cleaned is thrown ordinarily against the binding-cords with such force that in a comparatively short time they are worn out or cut in two before the upright bars or rods are worn out, and the efficiency of the machine thus impaired; but by forming the offset or recess for the binding-cords to lie in, the cords are covered and protected, so that they will not be cut through or worn. The upper ends of the bars or rods bear against an offset, $v$, formed around the periphery of a plate, Q, forming the top to the cleaning case or cylinder, and the binding-cords at such end lie within the offset or recess $v'$, formed below the offset $v$, so that the cords at that end of the case or cylinder are likewise covered and protected. Upright bars R of the desired number—say four—having a width of, say, one inch each and a thickness equal to the thickness of the case bars or rods—say three-sixteenths of an inch—are set around the upper and lower plates, P and Q, so that one will be between each two sections of the case or cylinder. These upright bars R are set in position before the sections of the case or cylinder, because they carry certain parts, hereinafter named, which will be inside of the case or cylinder. After the upright bars and sections of the case or cylinder are in place, tie bands or straps S are passed around the case or cylinder and drawn up by bolts $w$, so as to tighten the parts and hold them together.

The top of the cleaning case or cylinder is supported from the top plate or ring, E, by means of any desired number of arms, T, which are connected to the plate or ring, so as to permit the cleaning-case to be adjusted laterally—for instance, by means of cap-bolts $x$, which pass through the slots $y$ in the plate. This adjustment is made possible so that if the driving-shaft should move from the center of the case the latter can be adjusted to bring it into center again, as the shaft should, for effective work, be in the center of the cleaning-case.

The driving-shaft L carries a series of beaters, U, which are connected to the shaft in some suitable way. Preferably each beater is composed of a spider or arms, V, secured by hubs $a'$ and set-screw $c'$ to the shaft, and provided toward their outer ends with a plate, $z$, to which the blades or wings U' are connected, preferably by being cast therewith, so that they may be "chilled," the blades or wings being flattened and supported in an upright position, as shown, and extending above and below each plate, and those of each beater being independent of the others. By extending the beaters both above and below the plates $z$ the same action of the beaters is obtained above the plates $z$, as well as above the pans Y, and the superior results consequent thereon obtained. Instead of using a spider for the top beater, a plate, W, preferably of dish form, is used, so as to receive the grain as it is fed into the case.

It will be observed that the blades or wings decrease in size from top to bottom of the case, the first two sets being one size, the next two lower sets a smaller size, and the next two lower sets still a size smaller. The object of this is to create the greatest volume and strongest current of air in the upper portion of the case, where the grain is first introduced, so as to drive out the broken particles separated from the grain as fast as they form without permitting them to descend to the lower portion of the case, thus obtaining a better cleaning of the grain as it descends freed from so much of the foreign substances. It will also be observed that the beaters are brought in a descending scale nearer to the sides of the case or cylinder, so that the space between the beaters and vertical walls of the case or cylinder gradually increases from bottom to top of the case. The object of this is to permit the greatest rebounding in the upper portion of the case, so as to separate most of the foreign substances from the grain and break them up in that portion of the case, and, further, to hold the grain closer to the sides of the case as it descends and becomes more free from foreign substances, so as to more thoroughly smooth and polish it than would be the case if it were not held so close thereto.

The beaters below the two topmost sets have a jacket or wall, X, extending around the backs of the wings or blade, so as to confine the grain between the jacket and wall of the case or cylinder and thus limit the rebounding of the grain by making the space gradually smaller toward the lower end of the case. There is space enough at the top and bottom of the beaters, between the blades or wings, for the air to pass through and out between the bars or rods of the case or cylinder; but in order that it may have freer egress or escape I prefer to have the jacket perforated, as shown, although it is apparent from what has been stated that an imperforate jacket is embraced within my invention. When the jacket is used, dust and some grain may be held against the face of the jacket by centrifugal force, and as the dust does not adhere alike all around the jacket there is a tendency to throw the beaters and jackets a little out of balance. To guard against such contingency, I provide a brush, $e'$, which may be supported in any suitable way—for instance, by attachment to a drum or guard, hereinafter described, so as to brush away from the jacket any particles that might adhere thereto. The brush is shown as applied to act on only two jackets; but it is obvious that it may be applied to all of them. It is also obvious that the jacket might be applied in the same way to all the beaters; but it is not considered necessary nor desirable to apply it to the two topmost sets.

Below each set of the beaters there is placed a pan or check-plate, Y, which is a circular plate or ring inclined inwardly and downwardly toward the center of the cleaning case or cylinder and supported by means of bolts or screws $f'$, passed through the upright bars R and into the check-plates. The check plates or pans are formed with offsets or notches $g'$ to receive the binding-cords of the case, so as to cover and protect them the same as the notches formed in the top and bottom plates, P and Q. These check plates or pans receive the grain as it passes down below the beaters and check the movement of the grain, so as to bring it almost to a stop when it slides down onto the plates $z$, from whence it is thrown by centrifugal force out against the rods or bars of the case the same as from the first or top plate, W. This stop or check motion of the grain prevents it from being carried around with the same speed as the beaters and allows it to be thrown out again by centrifugal force, so as to keep up the rebound, which cleans and polishes the grain as it passes through the case. A rim or flange, $h'$, is preferably formed around the inner edge of each plate $z$, so as to prevent the grain from passing over the same into the middle of the case. With the same object in view, I prefer to also use a drum or guard, Z, supported from each check plate or pan Y by fingers or lugs, or preferably by a ring, $i'$, a space or opening being left between the drum or guard and check plate or pan to permit the grain to flow onto the plate $z$. The fingers or ring to which the perforated drum is attached are connected to the plate Y by necks or bridges $i^2$. This drum or guard is perforated for the passage of air outwardly from the middle of the case. The drum or guard can, however, be omitted.

It sometimes happens that a kernel of grain will rebound from the plates $z$ into the center of the case, toward the shaft L; and to prevent such kernels from dropping down to the bottom of the case I place any desired number of perforated plates or screens, A', across the spiders V, so as to catch the kernels, which are then thrown back to the plates $z$ by centrifugal force. These plates A' are perforated for the passage of air; and while only two are shown applied, it will be understood that each spider may be provided with one. The bottom plate or ring, P, is provided with a guard or drum, Z', preferably perforated and made vertically adjustable by suitable means—for instance, by bolts $k'$ passed through the guard and through slots $l'$ in a flange, $m'$, formed on the ring or plate. The object of making this guard or drum adjustable is to keep its upper edge close to the under face of the bottom plate, $z$, in the vertical adjustment of the beaters, so that the grain will not pass from the plate or ring P over the guard and down under the casing.

The cleaned and polished grain passes from the bottom plate or ring, P, through a discharge-spout, B', to the suction-spout C'. The discharge-spout can be cast with the bottom plate or ring; but I prefer to cast it separate and suitably attach it thereto. It is provided with a weighted valve, D', to regulate the outflow of grain. With the view of getting the best results, I interpose a spout, E', between the discharge-spout and the suction-chamber, so that it is widest where it opens into the latter, as shown in Fig. 5. As illustrated, it is as wide as the suction-chamber where it opens into the latter. The effect of thus enlarging the opening into the suction chamber is to expose the grain in a broad thin sheet to the influence of the air, so that the separation is much more complete and perfect, and this is accomplished without the necessity of enlarging the discharge-spout B'. This construction does not necessitate an increased volume or force of air, because the interposed spout E' is made shallow and the increase in the width is thus compensated for. The spout E' is provided with a hinged top, $n'$, and with leaders or spreaders $o'$, which divide the stream of outflowing grain and cause it to spread out over the bottom of the spout E'. The light particles carried up the suction-chamber C' pass into the settling chamber or trap F', and are removed therefrom through a flap-door, G', while the air passes onward past the valve H', controlled by a lever, I', and locking-nut J', and through an opening, $p'$, in the drum F into said drum, and from thence into the fan-case.

The grain to be cleaned is fed to the top plate W through a combined grain-feed and air-spout, K', which passes through the side of drum F and through the top plate Q near the center of the latter, so as to discharge the grain into the middle of plate W. The suction created by the beaters and the fan tends to create a vacuum in the cleaning-case, and to fill the same the air is drawn in not only through the bottom of the case around the shaft, as heretofore, but also through the spout K' at the top of the case. The requisite amount of air to effect the best results is thus supplied. This combined grain and air spout is large enough for the purpose, and the grain is delivered to the enlarged or hopper end thereof through a spout, L', while the air enters through an opening, $q'$, therein. By providing for the inlet of both grain and air through the spout K' the spout can be set at a less inclination from the horizontal line than would be otherwise necessary, as the air assists in moving the grain, and an easier feed, productive of better results, is thus effected.

The chamber which incloses the cleaning case or cylinder is composed of the requisite number of metallic sections, $N^2$, formed with flanges O', so that when the sections are set between the legs D they may be secured in place by bolts P', passed through the flanges and legs. These sections can be easily and quickly removed for access to the cleaning-case and can be readily put in place again.

The operation, briefly recapitulated, is that the shaft is turned so as to revolve the fan and beaters, which draw an air-current through the cleaning-case. The grain is fed, together with air, through the spout K' into the dished plate W. The centrifugal power or force throws the grain out against the bars or rods forming the walls of the cleaning-case, and the grain rebounds and is knocked back by the beaters. The particles thus separated from the grain are blown out between the rods or bars of the case, and the grain slides down the check plate or pan onto the next lower plate, from which it is thrown by centrifugal force against the sides of the case and moved by the beaters as at first, and so the action continues; but the rebounding is gradually checked and the grain held closer to the bars of the case until it reaches the bottom of the case and passes onto the bottom plate or ring, from whence it passes through the discharge-spout into the interposed spout, from which it passes in a broad thin stream, thoroughly cleaned and polished, into the suction-chamber, where the loosened and lighter particles are carried upward, while the grain is discharged below thoroughly cleaned and polished and foreign substances separated from it without further treatment.

The blades or wings U' are made of cast-iron and chilled, so that they are extremely hard and durable and wear much longer than if made of steel.

If the rods or bars composing the cleaning case or cylinder are bound together by the wire cords interwoven as shown in Fig. 8, the notches or offsets in the check plates or pans to receive the same may be omitted, the binding-cords in such case being soldered to the rods or bars; but I prefer to use the notches, as the binding-cords are then completely covered and protected. It will be understood, too, that the binding-cords will be only opposite the check plates or pans and top and bottom plates, so that they will have some protection from said parts. The binding-cords can also be protected by a steel band or strip, Q', laid over them and secured to the upright bars R by bolts or rivets passed through them, as shown in Fig. 9. This method is particularly well adapted for use where the blades or wings in machines as ordinarily made extend the whole length of the case. It will thus be apparent that I design to cover a protecting-covering for the binding-cords whether it be made by the plates or pans or by separate bands.

When the bars or rods composing the case are made in the manner heretofore practiced, the bars or rods are liable to turn when the binding wires or cords become worn, and thus form wider spaces between the bars or rods if the worn side of the rod be brought opposite to the next rod, and, besides, if the bars or rods turn, the cleaning is not as satisfactory as when they are rigid. To prevent them from turning, I form each rod with any desired number of notches, r', as shown in Figs. 10 and 11, for the binding-cord or some strand of it to lie in. This notch forms an angular edge which will bear against the cord and prevent the rod or bar from turning.

It may be stated here that the object in making the shaft and its beaters adjustable is to regulate the speed at which the grain shall pass through the machine. The nearer the beaters are brought to the check-plates the smaller the space for the grain to pass through, and, consequently, the grain is held longer in the machine. On the other hand, if the beaters be raised to make a larger space, the grain will pass through faster. It will thus be seen that by this adjustment the operator controls the passage of the grain to suit his judgment and its condition. I wish it also understood that any one of the three forms of beaters shown may be used in one machine to meet the wants of the operator, and the same be a part of my invention.

I have described in detail and with particularity what I consider the best form and detail of construction of all parts forming the machine; but I wish to expressly state that I do not mean to be confined to exact details, except as particularly specified in the following claims.

Having described my invention and set forth its merits, what I claim is—

1. In a smut-machine, the combination, with a cleaning case or cylinder formed of upright bars with spaces between them, of a series of beaters having blades or wings decreasing in size from the upper to the lower portion of the case or cylinder, substantially as described.

2. In a smut-machine, the combination, with a cleaning case or cylinder, of a series of beaters gradually approaching nearer to the sides of the case or cylinder from the upper to the lower portion thereof and a series of pans interposed between upper and lower series of beaters, substantially as described.

3. In a smut-machine, the combination, with a cleaning case or cylinder, of a series of beater blades or wings arranged one above the other, the upper series being farther removed from the sides of the case than the lower series, substantially as described.

4. In a smut-machine, the combination of a cleaning case or cylinder, a series of beater blades or wings arranged one above the other within the case or cylinder and approaching the sides of the case or cylinder from the upper to the lower portion thereof, a jacket or wall back of the front edges of one or more sets of blades and nearer to the wall of the cylinder at the lower than at the upper portion, and downwardly-inclined check plates or pans interposed between the sets of said blades or wings, substantially as described.

5. In a smut-machine, the combination of a cleaning case or cylinder, a series of beater blades or wings arranged one above the other within the case or cylinder, and revolving plates interposed between the said blades or wings to receive the grain on its passage down the series of beaters, the said blades or wings extending above and below the plane of each plate, substantially as described.

6. In a smut-machine, the combination of a cleaning case or cylinder, of a series of beater-blades arranged one above the other within the case or cylinder, and revolving plates interposed between said blades or wings to receive the grain on its passage down the series of beaters and each provided with a flange to prevent the grain passing over one edge of the plate, the said beater-blades projecting above and below the plane of each plate, substantially as described.

7. In a smut-machine, the combination of a cleaning case or cylinder, a series of beater blades or wings arranged one above the other within the case or cylinder, downwardly and inwardly inclined check plates or pans interposed between said blades or wings, and revolving plates onto which the grain is delivered from the inclined plates or pans, said blades or wings projecting above and below the plane of said revolving plates, substantially as described.

8. In a smut-machine, the combination of a cleaning case or cylinder, a series of beater blades or wings, revolving plates to receive the grain on its passage from the upper to the lower portion of the case or cylinder, and a stationary perforated drum or guard between the revolving plates to prevent the passage of the grain to the center of the case or cylinder, substantially as described.

9. In a smut-machine, the combination of a cleaning case or cylinder, a series of beater blades or wings within the case or cylinder, jackets around the inner edges of the blades or wings to limit the rebounding of the grain between said jackets and side of the case or cylinder, and a series of pans projecting inwardly from the cylinder and between said jackets, substantially as described.

10. In a smut-machine, the combination of a cleaning case or cylinder, a series of beater blades or wings within the case or cylinder, perforated jackets around the inner edges of the blades or wings to limit the rebounding of the grain between said jackets and side of the case or cylinder and permit the passage of air from the interior of the cylinder through said jackets, and pans projecting inwardly from the casing between said jackets, substantially as described.

11. In a smut-machine, the combination of a cleaning case or cylinder, a series of beater blades or wings within the case or cylinder, jackets around the inner edges of the blades or wings to limit the rebounding of the grain between said jackets and side of the case or cylinder, and a brush to remove adhering substances from said jacket, substantially as described.

12. In a smut-machine, the combination of a cleaning case or cylinder, an adjustable shaft carrying a series of revolving plates and beaters, a fixed annular plate or ring at the lower end of the case or cylinder, and a drum or shield around the inner periphery of the fixed plate or ring and vertically adjustable between it and the lower revolving plate, substantially as and for the purpose set forth.

13. In a smut-machine, a cleaning case or cylinder composed of a top and bottom plate, each formed with an offset and a recess or notch in its periphery, a series of upright bars or rods fitting said offsets, and cords binding said rods or bars together and fitting in said notches or recesses, substantially as and for the purpose set forth.

14. In a smut-machine, a cleaning case or cylinder composed of top and bottom plates, upright bars bearing against said plates, a series of bars or rods bound together in sections by cords, a section being fitted between each two upright bars, and bands passed around said sections and uprights and connected together at their ends to clamp said parts together, substantially as described.

15. In a smut-machine, the combination of a cleaning case or cylinder composed in part of upright bars or rods connected together by binding-cords, and a series of plates or pans located within the case or cylinder and formed with recesses to receive said binding-cords, substantially as described.

16. In a smut-machine, the combination of a cleaning case or cylinder composed in part of upright bars, a series of upright bars or rods connected together in sections by binding-cords, each section fitted between said first-named upright bars, and plates or pans within the case or cylinder connected to said first-named bars and formed with recesses to receive the binding-cords, substantially as described.

17. The combination, with a series of upright bars or rods connected together by binding-cords to form the cleaning case or cylinder of a smut-machine, of a protecting-covering for said binding-cords, substantially as described.

18. In a smut-machine, the combination of a cleaning case or cylinder having an inlet for air at its lower portion, a shaft passing through the same and carrying a series of beaters, a receiving-plate within the case or cylinder at the upper end thereof, a combined grain and air feeding spout having an inlet for air and one for the grain and opening into the case or cylinder to deliver to the top receiving-plate, whereby said spout may be less inclined and air admitted to assist the flow of the grain, and a fan to create an air-current through the case or cylinder, substantially as described.

19. The combination, with the upright bars D, sectional sides $N^2$, and drum F, of the annular plate E, connecting said bars together at their upper ends and interposed between them and said drum to form a base for said drum, and in connection with said uprights a frame in which said sectional sides may fit, substantially as described.

20. In a smut-machine, the combination of the plate E, formed with flange $g$, drum F, resting thereon, plate G, formed with opening $i$ and having flange $h$ on its under face, fitting inside of drum F, and flange $k$ on its upper face, drum I, resting on plate G and fitting around flange $k$, and the plate J, resting upon drum I and having flange $l$ fitting inside of said drum, substantially as and for the purpose set forth.

21. In a smut-machine, the combination of the base formed with upwardly-extending lugs, the upright channeled bars resting upon said base and having said lugs fitting in the channels of the bars, the top plate formed with lugs fitting in the channels of the bars, and bolts passing through the lugs and bars to secure the parts together, the said parts forming a portion of the frame of the machine, substantially as described.

22. In a smut-machine, the combination, with the cleaning case or cylinder, of an exterior inclosing-casing composed of upright bars diverging outwardly from their lower portions upwardly, sectional sides fitting in between said bars and secured thereto, the bars and sides forming a casing having a wall diverging from its lower end upwardly to form a space around the cleaning case or cylinder, enlarging from the bottom to the top of the case, and a shaft carrying a series of beaters within the cleaning-case, arranged one above the other and decreasing in size from the upper to the lower end of the casing, substantially as and for the purposes described.

23. The combination, with the circular bars or rods formed with notches, of binding-cords securing said bars or rods together and lying in the notches of the bars or rods to keep them from turning, substantially as described.

In testimony whereof I affix my signature in presence of two witnesses.

FAUSTIN PRINZ.

Witnesses:
HENRY NEUSER,
H. GRUNDMAUR.